Aug. 17, 1954     R. H. DICKE     2,686,901
TURNSTILE JUNCTION FOR PRODUCING CIRCULARLY POLARIZED WAVES
Filed Nov. 5, 1945     2 Sheets-Sheet 1

P/2 IN ROUND GUIDE

POWER P INCIDENT IN THE ROUND GUIDE

INVENTOR
ROBERT H. DICKE
BY *[signature]*
ATTORNEY

Aug. 17, 1954     R. H. DICKE     2,686,901
TURNSTILE JUNCTION FOR PRODUCING CIRCULARLY POLARIZED WAVES
Filed Nov. 5, 1945     2 Sheets-Sheet 2

INVENTOR
ROBERT H. DICKE
BY Ralph L. Chappell
ATTORNEY

Patented Aug. 17, 1954

2,686,901

UNITED STATES PATENT OFFICE 2,686,901

TURNSTILE JUNCTION FOR PRODUCING
CIRCULARLY POLARIZED WAVES

Robert H. Dicke, Cambridge, Mass., assignor, by mesne assignments, to the United States of America as represented by the Secretary of the Navy Application November 5, 1945, Serial No. 626,848

4 Claims. (Cl. 333—21)

This invention relates to junctions of hollow wave guides, and to the means of matching such junctions. It relates in particular to hollow wave guide junctions which are used to divide the radio frequency power transmitted by the junction, or to vary the polarization of the transmitted wave.

Wave guide junctions and sections have been used previously for power division and for changing polarization, but it has been necessary to design a wave guide junction, or section, for each such application. In junctions so used, the various factors, such as the ratio in which the power is divided between the branches of the junction, or the plane of polarization of the transmitted wave, were fixed by the design and unalterable in use.

Accordingly, it is the object of this invention to provide a junction of hollow wave guides which will present a matched load to energy incident in any branch, and which has variable characteristics.

It is also an object of this invention to provide a matched hollow wave guide junction which can be quickly and easily modified to perform a plurality of functions.

It is also an object of this invention to provide a matched hollow wave guide junction which can be used to vary the polarization of the radio frequency energy transmitted by the junction.

It is also an object of this invention to provide a matched hollow wave guide junction which can be used as a variable directional coupler, or as a variable power divider.

It is further an object of this invention to provide a matched hollow wave guide junction which can be used as a magic T wave guide bridge.

A better understanding of the invention may be had by referring to the accompanying drawings, in which.

In the following discussion it is to be understood that the dimensions of the wave guides in the junction are so chosen that the rectangular branches will support radiation only in the $TE_{01}$ mode, and the circular branch will support radiation only in the $TE_{11}$ mode. This can be done since the chosen modes are the dominant modes for the specified types of wave guide, and so have longer cut-off wave lengths than any other mode which may be excited in such wave guides. In the $TE_{01}$ mode of the rectangular wave guide, all components of the electric field lie in a plane transverse to the direction of propagation and there are no half-period variations in the density of the electric field across the narrower dimension of the wave guide, and there is one half-period variation in the density of the electric field across the wider dimension of the wave guide. In the $TE_{11}$ mode of the circular wave guide, all components of the electric field lie in a plane transverse to the direction of propagation, there being one full-period variation of the radial component of the electric field along the angular direction, and one half-period variation in the angular component of the electric field along the radial direction.

Figure 1:
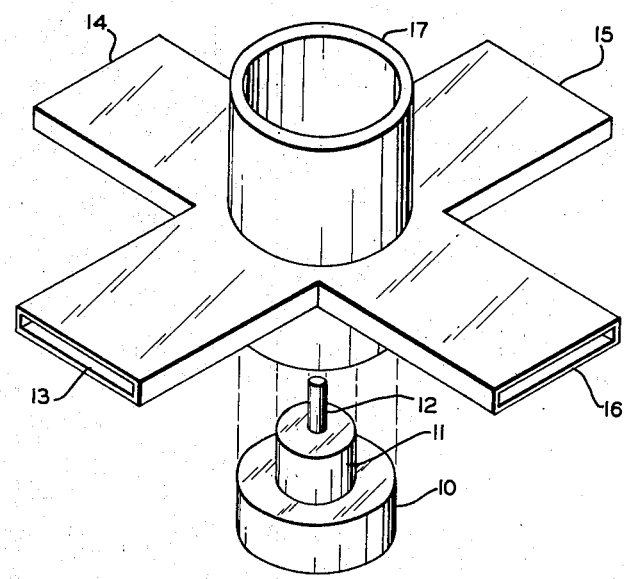
Fig. 1 is a view of an embodiment of the invention showing a symmetrical junction of four parallel connected rectangular wave guide sections with one circular section and the three element plunger used for matching the junction.
Figure 2:
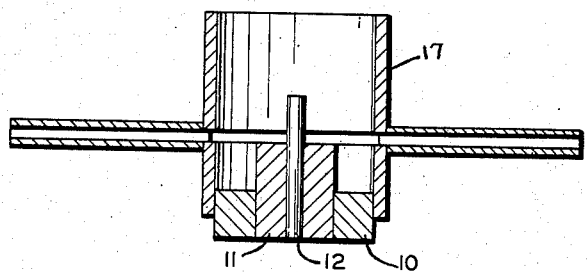
Fig. 2 is a cross-section through the junction showing the matching plunger in place.
Figure 3A:
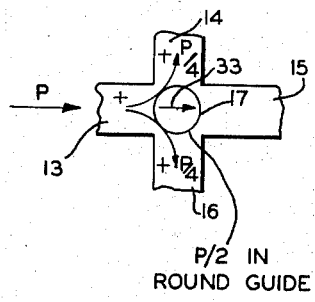
Figs. 3A and 3B are schematic plan views illustrating the manner in which the transmitted power may be divided in the junction.
Figure 3B:
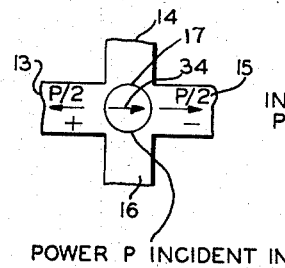

In reference to Fig. 1, the four sections of rectangular wave guide 13, 14, 15 and 16 are parallel connected and symmetrically joined to the section of circular wave guide 17. The axes of the five wave guide branches meet in a common point and are mutually perpendicular. This junction will have four planes of symmetry. As a consequence of the symmetry characteristics, three independent variables will be sufficient to adjust the impedances of the junction to provide a matched load for radiation incident in any branch of the junction. When the junction is so matched, each branch sees at the junction its characteristic impedance if each of the other branches is terminated in its characteristic impedance. There will then be no undesirable reflections of energy at the junction. The three needed variables for matching the junction are supplied by the positions of the three elements 10, 11, and 12 of the triple tuning plunger shown inserted in the circular wave guide branch in Fig. 2. To match the junction, elements 10 and 11 are first adjusted so that there will be no reflection of energy at the junction when radiation is incident at the open end of the circular branch. Then, keeping 10 and 11 fixed, the position of element 12 of the triple plunger is adjusted to produce an approximate match at the junction for energy incident in any of the rectangular wave guide branches. Then, keeping 12 fixed, 10 and 11 are again adjusted and the whole process is repeated several times until a satisfactory match is obtained. When the junction has been properly matched by this procedure, the transmitted power will be divided as shown in Figs. 3A and 3B. Referring to Fig. 3A, if an amount of power, say P, in the $TE_{01}$ mode is incident in rectangular branch 13, as shown, the two orthogonal branches 14 and 16 will be excited equally and in phase in the $TE_{01}$ mode, and each with power equal to P/4. Circular branch 17 will be excited in the $TE_{11}$ mode with power equal to P/2. The phase symmetry of the outgoing waves in branches 14 and 16 are shown by the positive signs in Fig. 3A. The plane of polarization of the $TE_{11}$ mode in circular branch 17 is indicated by arrow 33 in the circle. It should be remembered that the dimensions of the junction are such that the rectangular and circular branches will support only the $TE_{01}$ mode and the $TE_{11}$ mode, respectively.

Referring to Fig. 3B, if an amount of power P is incident at the open end of circular branch 17 in the polarization shown by arrow 34, it will excite rectangular branches 13 and 15 equally but out of phase and the power in each will be P/2. If the polarization of the rediation incident in circular guide 17 were rotated by 90°, rectangular branches 14 and 16 would be excited instead of branches 13 and 15. The opposite phases of the outgoing waves in the rectangular branches are indicated by the positive and negative signs in Fig. 3B.

Figure 4:
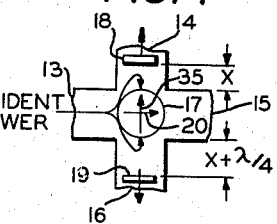
Fig. 4 is a schematic plan view illustrating the manner in which the polarization of the energy wave in the circular wave guide branch of the junction may be varied.

Fig. 4 is a plan view illustrating the manner of operation of the junction in one of its applications. Reflecting plungers 18 and 19 are inserted into a pair of opposite rectangular branches, say 14 and 16, in such a manner that their distances from the common junction point differ by one-quarter wave length. If power P is incident in branch 13 of the junction, branches 14, 16 and 17 will be excited as previously described with reference to Fig. 3A. One-half of the incident power will pass up circular branch 17 with a polarization shown by arrow 20. The remaining half of the power will divide equally between rectangular branches 14 and 16 exciting them in phase. Upon reflection from plungers 18 and 19, this energy will excite circular branch 17 in a polarization in space quadrature with arrow 20. This will occur since the positions of plungers 18 and 19 are such that the total paths traveled by the energy in branches 14 and 16 will differ by one-half wave length. Then, the reflected energy from branch 14 will arrive at the common junction point in opposite phase from the reflected energy in branch 16. With the plungers placed as shown in Fig. 4, the reflected radiation from branch 16 will lag the radiation from branch 14. This constitutes the reverse of the situation illustrated by Fig. 3B and the polarization of the wave excited in circular branch 17 by this reflected energy will be as indicated by arrow 35.

The time phase relationship between the two space polarizations excited in circular wave guide 17 as described above will be determined by the distance from the junction to plungers 18 and 19. As the distance X in Fig. 4 is varied, the phase of one polarization in the circular wave guide changes with respect to the phase of the other. There will be a certain distance X which will cause this phase difference between the two space polarizations of the E vector to be 90°. For this condition, the resultant wave excited in circular branch 17 will be circularly polarized. In the manner described, the invention, with plungers 18 and 19 properly positioned, can be caused to furnish all of the power incident in one of the rectangular branches as the $TE_{11}$ mode in the cylindrical wave guide with a variable polarization of the E vector. In particular, all of the energy so incident can be transmitted as circularly polarized $TE_{11}$ radiation in the cylindrical wave guide. In such a case, power fed in by the opposite rectangular guide emerges from the round guide rotating in the opposite direction.

Figure 5:
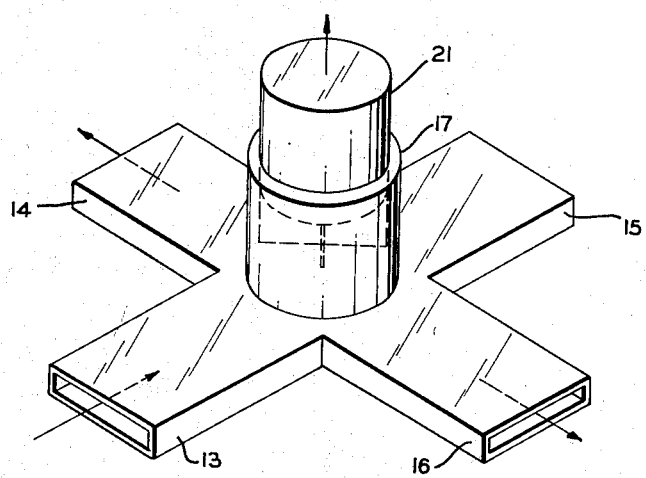
Fig. 5 is a view of the junction with a special plunger inserted in the circular branch to rotate the plane of polarization of the reflected wave in the circular branch and so vary the division of power between two rectangular branches of the junction.
Figure 6:
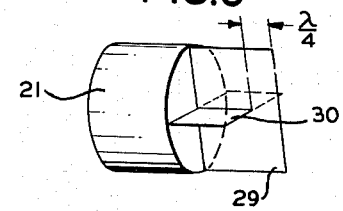
Fig. 6 is a view of one form of the special plunger shown in Fig. 5.
Figure 7:
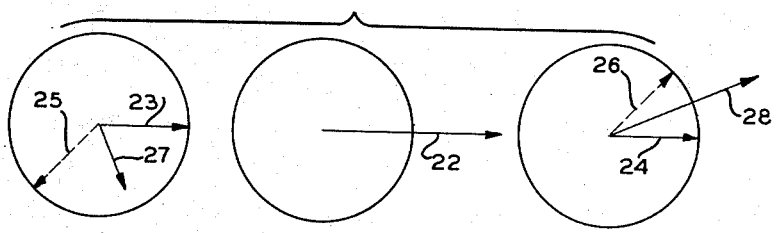
Fig. 7 is a set of vector diagrams showing the phase relationships of the energy waves in the rectangular branches of the junction when the special plunger of Fig. 5 is in use; and, Fig. 8 is a sketch of the junction showing the manner in which it may be used as a magic T wave guide bridge.

Another application of the invention is that of a variable directional coupler or power divider. With reference to Fig. 5, the upper end of circular wave guide branch 17 is fitted with a special plunger 21. The function of plunger 21 is to reflect the energy coming up circular branch 17 and simultaneously to rotate the plane of polarization by 90°. The construction of plunger 21 will be considered later with reference to Fig. 6. With plunger 21 in place, a power P incident in say branch 13, will excite the two orthogonal branches 14 and 16 equally and in phase, each being supplied with power P/4 as described with reference to Fig. 3A. One-half of the power P will be furnished to circular branch 17, and this energy will be reflected by plunger 21 with its plane of polarization rotated by 90°. This reflected energy will then have the proper polarization to excite rectangular branches 14 and 16 equally and out of phase as shown by Fig. 3B. For further clarification, reference is made to Fig. 7 which is a set of vector diagrams showing the time phase relationships of the radiation in the three rectangular branches 13, 14 and 16. In Fig. 7, line 22 represents the wave incident in branch 13, its length indicating the amplitude of the wave, and its angular position the phase of the wave. Lines 23 and 24 represent the waves excited directly in rectangular branches 14 and 16 respectively, the length and angular positions of the lines indicating the amplitude and phase of each. As was seen with respect to Fig. 3A, all three vectors have the same angular position since the three waves are in phase. Also, the waves in rectangular branches 14 and 16 have each one-half the amplitude of the wave incident in branch 13. Since the power in a wave is proportional to the square of the amplitude, the power so excited in each of branches 14 and 16 will be one-quarter of the power incident in branch 13. Lines 25 and 26 of Fig. 7 represent the waves excited in branches 14 and 16, respectively, by the energy reflected from plunger 21, the amplitude and phase being indicated by the length and angular position of the lines. Since this reflected energy will excite branches 14 and 16 out of phase, lines 25 and 26 are drawn with 180° difference in angular position. Also, one-half of the reflected power will be supplied to each of the rectangular branches; and, since the reflected wave has one-half of the power originally incident in branch 13, lines 25 and 26 have the same length as lines 23 and 24. The time phase of each of the waves excited in branches 14 and 16 by the energy reflected from plunger 21 will depend upon the distance from the common junction point to plunger 21 and return, that is upon the depth of insertion of plunger 21 into the top of circular branch 17. The energy wave which will pass down each of rectangular branches 14 and 16 will be the vector sum of the two waves excited in each branch in the fashion described above. The time phase and amplitude of the resultant wave in branch 14 can be represented on Fig. 7 by the line 27 which is the vector sum of lines 23 and 25. The time phase and amplitude of the resultant wave in branch 16 is similarly represented on Fig. 7 by line 28. It can be seen that lines 25 and 26 can be rotated through 360° on the phase diagram of Fig. 7 by adjusting the position of plunger 21 in branch 17 through one-half wave length. By so doing, the division of the transmitted power between branches 14 and 16 can be varied continuously from a condition where all of the power incident in branch 13 or 15 is transmitted by branch 14 and none by branch 16, to a condition where all of the power is transmitted by branch 16 and none by branch 14. The first of the above conditions corresponds to the situation on Fig. 7 where line 25 lies along line 23 and line 26 lies in a direction directly opposite to that of line 24. In the second condition, lines 24 and 26 have the same angular position and lines 23 and 25 are opposing. It can be seen that if energy were incident in rectangular branch 14, with plunger 21 properly positioned, no energy will be transmitted by branch 16, but all of the power will be divided in any desired ratio between branches 13 and 15. One application of the embodiment of the invention shown in Fig. 5 can be as a variable power divider feeding two loads from a single source with the power divided between the two loads in any desired ratio.

In the above description, it was noted that for radiation incident in branch 13, any desired percentage could be transmitted by branch 16, while none of the return radiation incident in branch 14 would be transmitted by branch 16. The invention will thus serve as a directional coupler, or wave selector, variable in its attenuation. Further, since any part of the return energy incident in branch 14 can be transmitted by branch 15 the invention will serve as a two-way directional coupler.

Due to the symmetry of the junction, the above analysis would apply for radiation incident in any of the four rectangular branches, the power being divided between the two orthogonal branches.

The function of plunger 21 has been described in the above discussion. Fig. 6 is a sketch of one embodiment of plunger 21. In Fig. 6, the plunger is provided with two dielectric vanes 29 and 30 which are perpendicular to one another, and vane 29 is one-quarter wave length longer than vane 30. The plunger is oriented in circular wave guide branch 17 so that each of these vanes makes an angle of 45° with the electric field in branch 17. Under these circumstances, dielectric vanes 29 and 30 will set up electric fields of equal amplitude but with a space orientation of 90°. Due to the half wave length path difference for these two components (one-quarter wave length going, and one-quarter wave length returning), the polarization of the reflected wave in circular branch 17 will be rotated 90° with respect to the polarization of incoming wave. The direction of this rotation of the polarization can be reversed by a 90° rotation of plunger 21 in branch 17.

Figure 8:
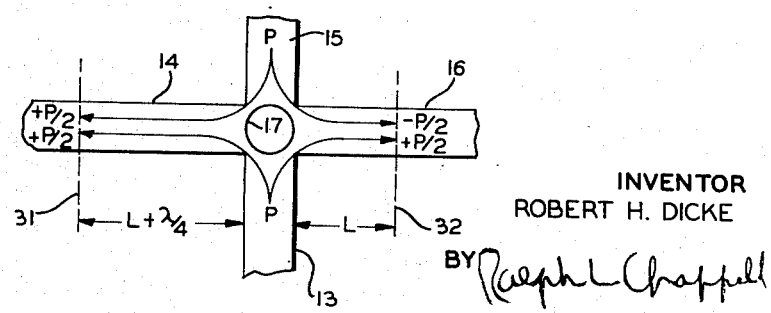

Still another application of the invention can be outlined with reference to Fig. 8. This is a special case of the wave guide junction and plunger 21 shown in Fig. 5. Plunger 21 is inserted in circular branch 17 to such a point that the vectors represented by lines 25 and 26 in Fig. 7 will be at right angles to the vectors represented by lines 23 and 24. With these conditions satisfied, rectangular branches 14 and 16 will be excited equally and 90° out of phase by radiation incident in branch 13 and branch 15 will not be excited. Two reference planes through branches 14 and 16 are indicated on Fig. 8 by lines 31 and 32. Reference planes 31 and 32 are so chosen as to differ in their distance from the common junction point by one-quarter wave length. At reference planes 31 and 32, radiation incident in rectangular branch 13 will excite branches 14 and 16 equally and in phase, with no radiation appearing in branch 15. The phase symmetry is shown in Fig. 8 by positive signs in branches 14 and 16, the incident power being designated by P as before.

However, for the same reference planes and for the same orientation of plunger 21, radiation incident at rectangular branch 15 will excite branches 14 and 16 equally, but 180° out of phase with no radiation appearing in branch 13. This phase opposition is indicated on Fig. 8 by positive and negative signs. This 180° phase difference will occur because the plane of polarization in circular branch 17, when it is excited by branch 15, will be 180° out of phase with the polarization when circular branch 17 is excited by radiation from branch 13. Further, if branches 14 and 16 are excited equally and in phase at reference planes 31 and 32, all of this radiation will appear in branch 13 with none in branch 15, whereas if they are excited equally and out of phase at planes 31 and 32, all of the radiation will appear in branch 15 with none in branch 13. Under these conditions, the wave guide junction in combination with plunger 21 properly positioned and oriented will perform the functions of the magic T wave guide bridge as disclosed and claimed in the co-pending application of Robert H. Dicke (R. L. 53–69(1)), Serial No. 581,695, filed March 8, 1945.

A magic T is a wave guide junction fed by four transmission lines such that power fed in any one of the transmission lines splits equally between two of the other lines. There is neither reflected power nor coupling to the remaining fourth transmission line.

While certain applications of the invention have herein been described, it will be apparent to those skilled in the art that other applications and modifications are possible. The scope of the invention is limited only by the appended claims.

What is claimed is:

1. A hollow wave guide junction comprising a main circular wave guide branch, four rectangular wave guide branches, said rectangular branches being parallel connected and symmetrically joined with said circular branch, the axes of the five said branches meeting in a common point and being mutually perpendicular, and three concentric plungers closing one end of said circular wave guide branch, said plungers being independently movable for establishing a characteristic impedance termination for each of said wave guide branches at their junction.

2. The combination of claim 1 with movable reflecting plungers in an opposing pair of said rectangular wave guide branches, said plungers differing in distance from the common junction point by one-quarter wave length, said circular branch and said opposing pair of rectangular branches having primary energy waves excited by radiation incident in one of the said orthogonal rectangular branches, said plungers reflecting said primary energy waves in said opposing pair of rectangular branches, said reflected energy waves exciting in said circular branch a secondary wave having a polarization in space quadrature and a different time phase with respect to said primary energy wave in said circular branch, said time phase of said secondary wave being variable by motion of said plungers resulting in a variable polarization of the resultant wave transmitted by said circular wave guide.

3. The combination of claim 1 with movable reflecting plungers in an opposing pair of said rectangular wave guide branches, said plungers differing in distance from the common junction point by one-quarter wave length, said circular branch and said opposing pair of rectangular branches having primary energy waves excited by radiation incident in one of said orthogonal rectangular branches, said plungers reflecting said primary energy waves in said opposing pair of rectangular branches, said reflected energy waves exciting in said circular branch a secondary wave having a polarization in space quadrature and 90° out of time phase with respect to said primary energy wave in said circular branch, said primary and secondary waves resulting in a circular polarization of the radiation transmitted by said circular branch.

4. A hollow wave guide junction comprising two cross arms of rectangular wave guides intersecting at right angles, a circular wave guide coupled at right angles to the space common to the intersection, a three element independently adjustable plunger included within said intersection to adjust the impedances of said junction whereby a matched load is provided for radiation incident in any arm of said junction, and movable reflecting plungers in an opposing pair of said rectangular wave guide arms whereby a wave incident to an open rectangular wave guide arm is propagated as a variably polarized wave in said circular wave guide arm.

References Cited in the file of this patent

UNITED STATES PATENTS

| Number | Name | Date |
|---|---|---|
| 2,407,318 | Mieher | Sept. 10, 1946 |
| 2,410,838 | Ring | Nov. 12, 1946 |
| 2,410,840 | Samuel | Nov. 12, 1946 |
| 2,445,896 | Tynell | July 27, 1948 |